(12) United States Patent
Kim

(10) Patent No.: US 10,638,315 B2
(45) Date of Patent: *Apr. 28, 2020

(54) MOBILE COMMUNICATION TERMINAL HAVING PASSWORD NOTIFY FUNCTION AND METHOD FOR NOTIFYING PASSWORD IN MOBILE COMMUNICATION TERMINAL

(71) Applicant: Samsung Electronics Co., Ltd., Gyeonggi-do (KR)

(72) Inventor: Kyong-Su Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,532

(22) Filed: Mar. 6, 2015

(65) Prior Publication Data

US 2015/0181429 A1 Jun. 25, 2015

Related U.S. Application Data

(63) Continuation of application No. 14/300,958, filed on Jun. 10, 2014, now Pat. No. 8,990,579, which is a
(Continued)

(30) Foreign Application Priority Data

Sep. 21, 2006 (KR) .......... 10-2006-0091955

(51) Int. Cl.
*H04M 1/66* (2006.01)
*H04L 29/06* (2006.01)
(Continued)

(52) U.S. Cl.
CPC .......... *H04W 12/06* (2013.01); *H04L 63/083* (2013.01); *H04M 1/66* (2013.01); *H04M 1/72519* (2013.01)

(58) Field of Classification Search
CPC ....... H04L 63/083; H04W 12/06; H04M 1/66; H04M 1/72519
(Continued)

(56) References Cited

U.S. PATENT DOCUMENTS 8,024,577 B2 9/2011 Ohmori et al.
8,078,881 B1 12/2011 Liu
(Continued)

FOREIGN PATENT DOCUMENTS

KR 1020060080109 7/2006
KR 1020060129632 12/2006

OTHER PUBLICATIONS

Alex Katz, Windows XP Tablet PC Edition 2002 Service Pack 1 (released Nov. 2002), Toshiba Portege 3500, Nov. 7, 2002, 5 pages.

*Primary Examiner* — Kambiz Zand
*Assistant Examiner* — Benjamin A Kaplan
(74) *Attorney, Agent, or Firm* — The Farrell Law Firm, P.C.

(57) ABSTRACT

A method and an apparatus are provided for notifying a password in a mobile communication terminal. It is checked whether a password notification function is set. Input of a stored password is requested. An input password is received. It is checked whether the input password is identical to the stored password. Input of a stored secondary password is requested if the input password is not identical to the stored password. An input secondary password is received. It is checked whether the input secondary password is identical to the stored secondary password. A password is sent if the input secondary password is identical to the stored secondary password.

31 Claims, 7 Drawing Sheets

Related U.S. Application Data continuation of application No. 14/064,882, filed on Oct. 28, 2013, now Pat. No. 8,793,501, which is a continuation of application No. 11/838,527, filed on Aug. 14, 2007, now Pat. No. 8,572,393.

(51) Int. Cl.
*H04W 12/06* (2009.01)
*H04M 1/725* (2006.01)

(58) Field of Classification Search
USPC .......................................... 726/18; 713/183
See application file for complete search history.

(56) References Cited

U.S. PATENT DOCUMENTS

| | | |
|---|---|---|
| 2001/0047347 A1 | 11/2001 | Perell et al. |
| 2002/0073332 A1 | 6/2002 | Ishikawa et al. |
| 2003/0208683 A1 | 11/2003 | Johnson |
| 2004/0133812 A1 | 7/2004 | Ohmori |
| 2005/0038689 A1 | 2/2005 | Shahoumian |
| 2005/0097320 A1 | 5/2005 | Golan et al. |
| 2005/0273442 A1 | 12/2005 | Bennett et al. |
| 2005/0274796 A1 | 12/2005 | Miyashita |
| 2006/0037073 A1 | 2/2006 | Juels et al. |
| 2006/0156028 A1 | 7/2006 | Aoyama et al. |
| 2006/0173917 A1 | 8/2006 | Kalmick et al. |
| 2007/0044023 A1 | 2/2007 | Carter et al. |
| 2007/0050638 A1 | 3/2007 | Rasti |
| 2008/0062133 A1 | 3/2008 | Wolf |
| 2009/0055642 A1 | 2/2009 | Myers et al. |
| 2009/0163140 A1 | 6/2009 | Peckham et al. |
| 2009/0234862 A9 | 9/2009 | Begeja et al. |

MOBILE COMMUNICATION TERMINAL HAVING PASSWORD NOTIFY FUNCTION AND METHOD FOR NOTIFYING PASSWORD IN MOBILE COMMUNICATION TERMINAL

PRIORITY

This application is a Continuation Application of U.S. patent application Ser. No. 14/300,958, filed in the U.S. Patent and Trademark Office on Jun. 10, 2014, which is a Continuation Application of U.S. patent application Ser. No. 14/064,882, now U.S. Pat. No. 8,793,501, issued on Jul. 29, 2014, which is a Continuation Application of U.S. patent application Ser. No. 11/838,527, now U.S. Pat. No. 8,572,393, issued on Oct. 29, 2013, which claims priority to Korean Patent Application No. 2006-0091955, filed on Sep. 21, 2006, which are all hereby incorporated by reference for all purposes as if fully set forth herein.

BACKGROUND OF THE INVENTION

1. Field of the Invention

The present invention relates to a mobile communication terminal having a password notification function and a method for notifying a user of a password in the mobile communication terminal. More particularly, the present invention relates to a mobile communication terminal having a password notification function and a method for notifying a user of a password in the mobile communication terminal that allows transmission of a stored password or newly generated random password to a previously selected medium when an input password does not coincide with the stored password and a secondary password is entered by the user.

2. Description of the Related Art

With the recent expansion in information utilization and computerization in all aspects of everyday life, passwords are needed to access computer media, to perform credit transactions such as purchasing a product through an Internet shopping mall, and to withdraw cash from a bank. Thus, users may have many different passwords, which are very often difficult for them to remember.

Currently, mobile communication terminal users are required to enter passwords for international telephone services and Internet services in order to prevent excessive or inappropriate billing due to the unauthorized use of these services. Further, users are required to set passwords to prevent disclosure of personal information stored in their mobile communication terminals.

However, if a user has not accessed the service that requires the input of a password for a long period of time, the user may confuse the password with another password or forget the password entirely. Additionally, if a user frequently changes passwords, the user may confuse current passwords with previous passwords. In these cases, the user must gather the necessary identification documents and visit a service center in order to recover the forgotten password.

SUMMARY OF THE INVENTION

The present invention has been made to address at least the above problems and/or disadvantages and to provide at least the advantages described below. Accordingly, an aspect of the present invention provides a method for notifying a user of a password in a mobile communication terminal, thereby allowing a user to easily obtain a forgotten password without compromising security.

Another aspect of the present invention provides a mobile communication terminal having a password notification function.

According to one aspect of the present invention, a method is provided for notifying a password in a mobile communication terminal. It is checked whether a password notification function is set. Input of a stored password is requested. An input password is received. It is checked whether the input password is identical to the stored password. Input of a stored secondary password is requested if the input password is not identical to the stored password. An input secondary password is received. It is checked whether the input secondary password is identical to the stored secondary password. A password is sent if the input secondary password is identical to the stored secondary password.

According to another aspect of the present invention, a mobile communication terminal is provided having a password notification function. The terminal includes a password storing portion to store a primary password and a secondary password that is requested if an input password is not identical to the stored primary password. The terminal also includes a transfer medium storing portion to store a transfer medium comprising at least one of a phone number of a mobile communication terminal and an e-mail address to which a password is to be sent. The terminal additionally includes a transfer method storing portion to store a selection of at least one of the phone number of the mobile communication terminal and the e-mail address as a destination to which the password is to be sent. The terminal further includes a transmitting portion to send the password to the selected transfer medium if an input secondary password is identical to the stored secondary password.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF EMBODIMENTS OF THE PRESENT INVENTION

Figure 1:
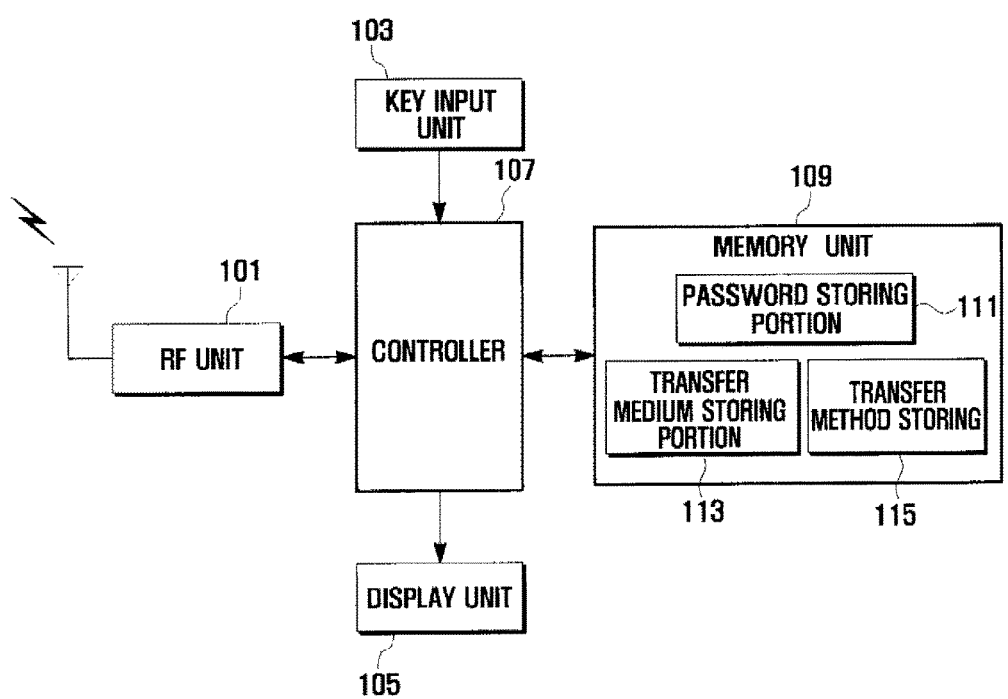
FIG. 1 is a block diagram showing a configuration of a mobile communication terminal for notifying a user of a password according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the 10 drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element 15 is referred to as being "directly on" or "directly connected to" another element or layer, there are no intervening elements or layers present.

In the exemplary embodiments, the term "password" refers to a password that is entered to unlock a specific function or all functions that are locked to prevent others from viewing or using the functions. A "secondary password" refers to a password that is requested 20 when an input password does not coincide with a stored password during an authentication operation. The secondary password may be a password that is frequently used by the user and is not subject to any length or character limitations.

FIG. 1 is a block diagram showing a configuration of a mobile communication terminal for notifying a user of a password according to an exemplary embodiment of the present invention.

Referring to FIG. 1, the mobile communication terminal according to the present exemplary embodiment includes a radio frequency (RF) unit 101, a key input unit 103, a display unit 105, a controller 107, and a memory unit 109.

The RF unit 101 performs the wireless communications of the mobile communication terminal. The RF unit 101 includes an RF transmitter and an RF receiver. The RF transmitter amplifies a signal being transmitted and up-converts its frequency. The RF receiver low-noise amplifies a signal being received and down-converts its frequency.

The key input unit 103 receives a user's manipulation signal to control the operation of the mobile communication terminal. For example, the user may use the key input unit 103 to enter a password to unlock functions in the terminal or to set a function for notifying the user of a forgotten password.

The display unit 105 is controlled by the controller 107 to display output data. The display unit 105 may display a password input window, a secondary password input window, or a password transfer window according to exemplary embodiments of the present invention.

The controller 107 performs the overall control operation of the mobile communication terminal. The controller 107 also controls the transfer of a password to a previously selected external destination, such as another mobile communication terminal or an email address.

The memory unit 109 includes a data memory and a program memory for performing mobile communication. According to exemplary embodiments of the present invention, the memory unit 109 stores a program for transferring a primary password to an external destination when a password entered by the user matches a stored secondary password. The memory unit 109 also includes a password storing portion 111 to store primary and secondary passwords, a transfer medium storing portion 113 to store information about an external destination to which a primary password is to be sent, and a transfer method storing portion 115 to store a selected method for transferring the primary password.

Figure 2:
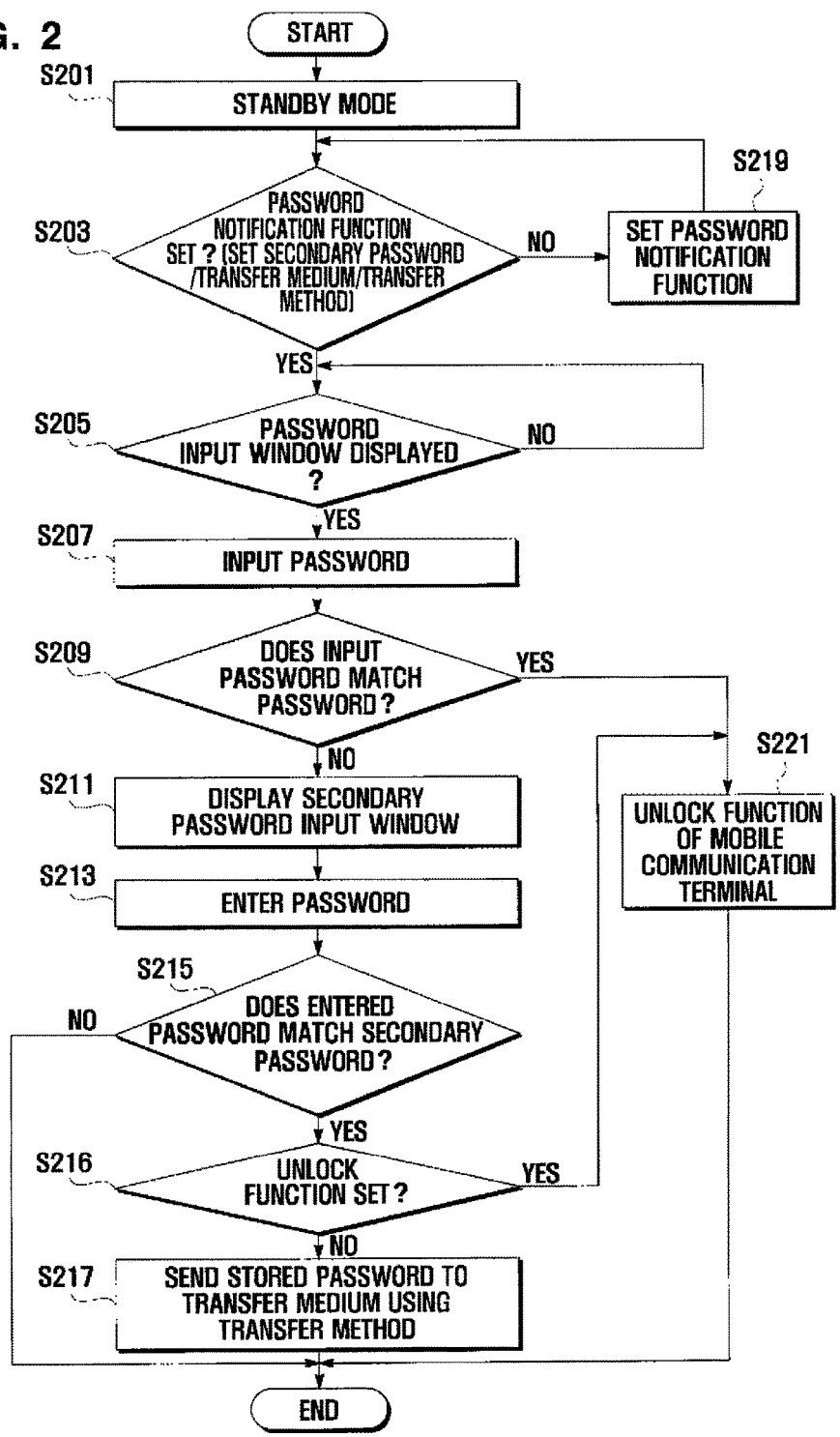
FIG. 2 is a flowchart showing a method for notifying a user of a password in a mobile communication terminal according to an exemplary embodiment of the present invention.
Figure 3A:
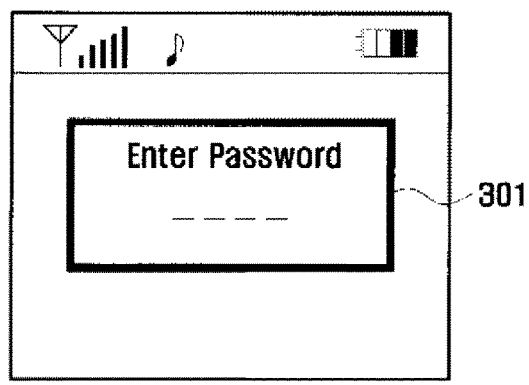
FIG. 3A shows a screen of a mobile communication terminal for notifying a user of a password, displaying a prompt requesting a password, according to an exemplary embodiment of the present invention.
Figure 3B:
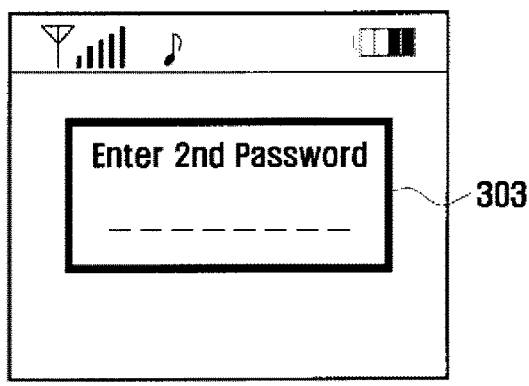
FIG. 3B shows a screen of a mobile communication terminal for notifying a password, displaying a prompt requesting a secondary password, according to an exemplary embodiment of the present invention.
Figure 3C:
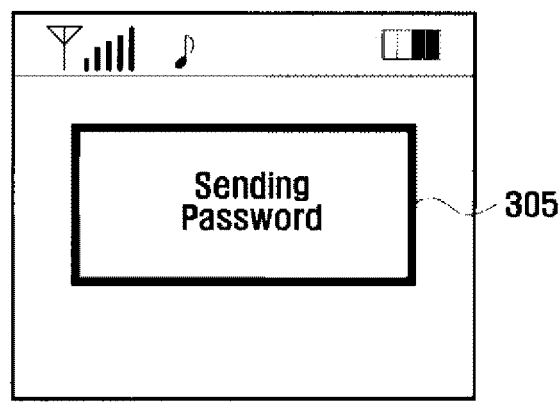
FIG. 3C shows a screen of the mobile communication terminal of FIG. 1 displaying a message to inform a user of the transfer of a stored password.

A method for notifying a user of a password in a mobile communication terminal according to an exemplary embodiment of the present invention is described in detail with reference to FIG. 1, FIG. 2, FIG. 3A, FIG. 3B, and FIG. 3C. FIG. 2 is a flowchart schematically showing a method for notifying a user of a password in a mobile communication terminal according to an exemplary embodiment of the present invention. FIG. 3A shows a screen of a mobile communication terminal for notifying a user of a password, displaying a prompt requesting a password, according to an exemplary embodiment of the present invention. FIG. 3B shows a screen of a mobile communication terminal for notifying a user of a password, displaying a prompt requesting a secondary password, according to an exemplary embodiment of the present invention. FIG. 3C shows a screen of the mobile communication terminal of FIG. 1 displaying a message to inform a user of the transfer of a stored password.

Referring to FIG. 1 and FIG. 2, the controller 107 recognizes a standby mode (S201). The controller 107 then checks whether a password notification function is set (S203). If the password notification function is not set, the controller 107 controls the key input unit 103 to set the password notification function (S219). When setting the password notification function, the controller 107 sets a secondary password in the password storing portion 111 of the memory unit 109. There are no limitations on the length or characters of the secondary password. It may be convenient to set the secondary password to a password frequently used by the user. For example, the secondary password may contain a combination of numbers and English characters. The controller 107 also selects the medium to which the password is to be transferred and the method by which the password is to be transferred and inputs this information to the transfer medium storing portion 113 and the transfer method storing portion 115 of the memory unit 109, respectively. For example, using the key input unit 103, the user may input a phone number of another mobile communication terminal or the user's e-mail address and set the notification function to transfer the password to either or both of the other mobile communication terminal and the e-mail address. When setting the password notification function, the user may set the controller 107 to unlock the functions of the mobile communication terminal, if the input number is identical to the stored secondary password.

Thereafter, the controller 107 checks whether a password input window is displayed on the display unit 105 (S205). If the password input window is not displayed on the display unit 105, the controller 107 controls the display unit 105 to display a password input window 301, as shown in FIG. 3A.

After the user responds to the password input window 301, the controller 107 receives input of a password that the user believes to be the password stored in the mobile communication terminal from the key input unit 103 (S207). That is, the user tries to remember the password stored in the mobile communication terminal and enters an attempted password into the password input window 301. Typically, the attempted password may be a 4-digit number.

Subsequently, the controller 107 checks whether the entered password is identical to the stored password (S209). If the entered password is identical to the stored password, the controller 107 unlocks the functions of the mobile communication terminal (S221).

If the entered number is not identical to the stored password, the controller 107 controls the display unit 105 to display a secondary password input window (S211). As shown in FIG. 3B, the controller 107 controls the display unit 105 to display a secondary password input window 303.

After the user responds to the secondary password input window 303, the controller 107 receives an input of a password that the user believes to be the stored secondary password through the key input unit 103 (S213). As described above, because the secondary password may be set to be a frequently used password, it may be remembered much more easily by the user than a primary password that may be easily forgotten due to frequent changes or little use.

The controller 107 then checks whether the input password is identical to the stored secondary password (S215). If the input password is not identical to the stored secondary password, the controller 107 terminates the process.

If the input password is identical to the stored secondary password in step S215, the stored password is sent to the previously selected terminal or e-mail address (S217). As shown in FIG. 3C, the password transfer window 305 informing the user of the transfer of the stored password is displayed on the display unit 105 and the stored password is sent to the medium that was set in step S203 using the set transfer method. For example, if the controller 107 set the transfer medium to be the user's e-mail address in step S203, the password is sent to the user's e-mail address.

If it is determined that the input password is identical to the stored secondary password in step 215 by the controller, the controller 107 checks whether the unlock function is set (S216). In other words, if the input password is identical to the stored secondary password, as described above, the stored password may be sent to a desired device. But the user should check the sent password again from the device in which the password transmitted. Accordingly, if the input password is identical to the stored secondary password, the controller 107 may unlock the functions of the mobile communication terminal (S221).

The mobile communication terminal having a password notification function and a method for notifying a user of a password in the mobile communication terminal according to the present exemplary embodiment allows the transmission of a primary password to a previously selected medium when, after the primary password is forgotten, the user enters a password that is identical to a secondary password, thus permitting the user to easily obtain the forgotten password without degrading security. The mobile communication terminal and the password notification method may improve user convenience.

Figure 4:
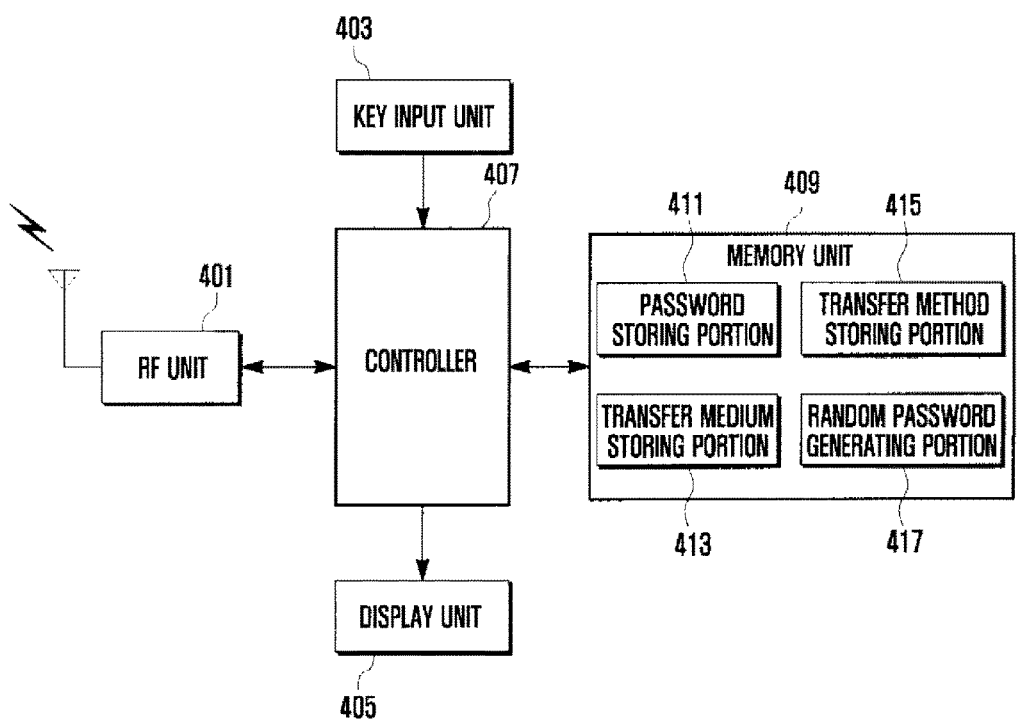
FIG. 4 is a block diagram showing a configuration of a mobile communication terminal for notifying a user of a password according to another exemplary embodiment of the present invention.

FIG. 4 is a block diagram showing a configuration of a mobile communication terminal for notifying a user of a password according to another exemplary embodiment of the present invention. A detailed description of elements having the same functions as their counterparts in the mobile communication terminal of FIG. 1 is not given.

A method for notifying a user of a password in the mobile communication terminal according to the present exemplary embodiment is similar to the method for notifying a user of a password in the mobile communication terminal of FIG. 1. The differing feature of the present exemplary embodiment is that a newly generated random password is transferred instead of a stored primary password when a password entered by the user coincides with a stored secondary password. That is, a memory unit of the mobile communication terminal according to the present exemplary embodiment further includes a random password generating portion.

Referring to FIG. 4, the mobile communication terminal according to the present exemplary embodiment includes an RF unit 401, a key input unit 403, a display unit 405, a controller 407, and a memory unit 409.

The key input unit 403 sets a function for generating a random password.

The display unit 405 displays a password transfer window informing a user of the transfer of a generated random password.

The controller 407 controls the key input unit 403, the display unit 405, and the memory unit 409 to generate and store a random password, and then sends the random password to a previously selected medium using a previously selected method.

The memory unit 409 stores a program for transmitting a random password to a previously selected external destination when a password entered by the user is identical to a stored secondary password. The memory unit 409 further includes a random password generating portion 417 for generating a random password.

Figure 5:
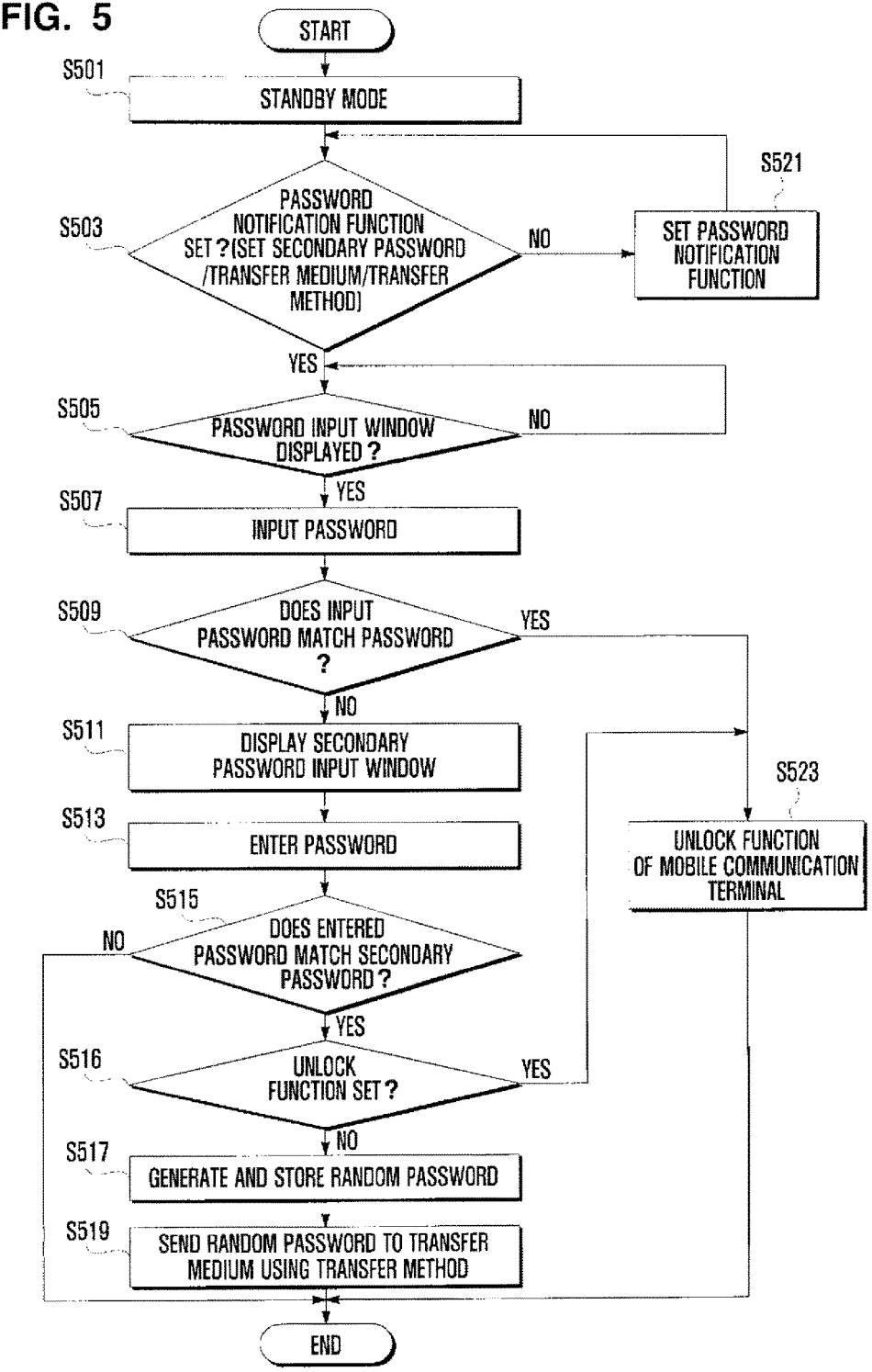
FIG. 5 is a flowchart showing a method for notifying a user of a password in a mobile communication terminal according to another exemplary embodiment of the present invention.
Figure 6:
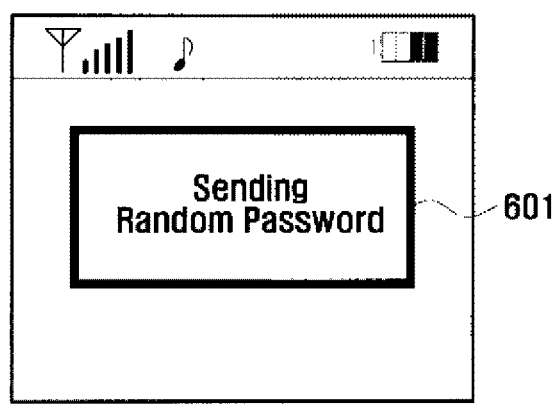
FIG. 6 shows a screen of the mobile communication terminal of FIG. 4 displaying a message to inform a user of the transfer of a newly generated random password.

A method for notifying a user of a password in a mobile communication terminal according to the present exemplary embodiment is described in detail with reference to FIG. 3A, FIG. 3B, FIG. 4, FIG. 5, and FIG. 6. FIG. 5 is a flowchart showing a method for notifying a user of a password in a mobile communication terminal according to another exemplary embodiment of the present invention. FIG. 6 shows a screen of the mobile communication terminal of FIG. 4 displayed to inform a user of the transfer of a newly generated random password. FIG. 3A shows a screen of a mobile communication terminal for notifying a user of a password, displayed to request a password, according to an exemplary embodiment of the present invention. FIG. 3B shows a screen of a mobile communication terminal for notifying a user of a password, displayed to request a secondary password, according to an exemplary embodiment of the present invention.

Referring to FIG. 4 and FIG. 5, the controller 407 recognizes a standby mode (S501). When setting the password notification function, the controller 407 also may be set to unlock the functions of the mobile communication terminal if the input number is identical to the stored secondary password.

The controller 407 then checks whether a password notification function is set (S503). If the password notification function is not set, the controller 407 controls the key input unit 403 to set the password notification function (S521). When setting the password notification function, the controller 407 sets a secondary password, a medium to which a password is to be transferred, and a method for transferring the password in a password storing portion 411, a transfer medium storing portion 413, and a transfer method storing portion 415 of the memory unit 409, respectively. The controller 407 also sets a function for generating a random password.

Thereafter, the controller 407 checks whether a password input window is displayed on the display unit 405 (S505). If the password input window is not displayed on the display unit 405, the controller 407 controls the display unit 405 to display a password input window 301, as shown in FIG. 3A.

After the user responds to the password input window 301, the controller 407 receives input of a password that the user believes to be the password stored in the mobile communication terminal from the key input unit 403 (S507).

Subsequently, the controller 407 checks whether the password entered by the user is identical to a stored password (S509). If the entered password is identical to the stored password, the controller 407 unlocks the functions of the mobile communication terminal (S523).

Conversely, if the entered password is not identical to the stored password, the controller 407 controls the display unit 405 to display a secondary password input window 303, as shown in FIG. 3B (S511).

After of the user responds to the secondary password input window 303, the controller 407 receives input of a password that the user believes to be the stored secondary password through the key input unit 403 (S513).

The controller 407 then checks whether the input password is identical to the stored secondary password (S515). If the input password is not identical to the stored secondary password, the controller 407 terminates the process.

If the input password is identical to the stored secondary password in the step S515, the controller 407 controls the random password generating portion 417 to generate a random password and controls the password storing portion 411 to store the generated random password (S517). The random password is a new password for the mobile communication terminal rather than of the stored password.

As described above, if it is determined that the input password is identical to the stored secondary password in step 515 by the controller, the controller 407 may unlock the functions of the mobile terminal (S516, S523). If the password is transmitted to a desired device, the transmitted password requires to be checked again. Therefore, as described above, if the secondary password is identical, the controller (407) may unlock the functions of mobile communication terminal.

Thereafter, the controller 407 sends the newly generated random password to a previously selected terminal or e-mail address using a previously selected transfer method (S519). More specifically, the controller 407 controls the display unit 405 to display a password transfer window 601 informing the user of the transfer of the random password, as shown in FIG. 6 and sends the random password to the medium selected in step S503 using the transfer method selected in step S503. And if the input password is identical to the stored secondary password, the controller may be set to unlock the functions of the mobile communication terminal; accordingly, unlocking of mobile communication terminal can be performed easily.

As described above, a mobile communication terminal having a password notification function and a method for notifying a user of a password in the mobile communication terminal according to the present invention enables the transmission of a stored password or a newly generated random password to a previously selected medium by allowing the user to enter a secondary password when an input password does not coincide with the stored password, thus permitting the user to easily obtain the forgotten password or a replacement password and enabling access without compromising security. Thus, the present invention may improve user convenience.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal comprising:
   a display;
   a memory; and
   a controller configured to:
   store, in the memory, first information and second information to be used to unlock the mobile terminal;
   store, in the memory, an e-mail address to be used in case of a failure to unlock the mobile terminal;
   receive a first input while the mobile terminal is in a locked state;
   present, via the display operatively coupled with the controller, a request for a second input, based at least in part on a first determination that the first input does not correspond to the first information;
   receive the second input in relation to the request;
   generate information based at least in part on a second determination that the second input corresponds to the second information; and
   transmit the generated information to the stored e-mail address.

2. The mobile terminal of claim 1, wherein the controller is further configured to:
   check whether a function is set to receive the second input based at least in part on the first determination.

3. The mobile terminal of claim 1, wherein each of the first and second information comprises information registered by a user corresponding to the mobile terminal.

4. The mobile terminal of claim 1, wherein the second information comprises at least one of a number or a character.

5. The mobile terminal of claim 1, wherein at least one of a type, a length, or a complexity of the first information is different from a corresponding one of a type, a length, or a complexity of the second information.

6. The mobile terminal of claim 1, wherein the controller is further configured to:
   present, via the display, an input window to receive the second input.

7. The mobile terminal of claim 1, wherein the controller is further configured to:
   present, via the display, an indication corresponding to a length of the second input.

8. The mobile terminal of claim 1, wherein the controller is further configured to:
   replace the first information with third information to be used to unlock the mobile terminal, the replacing based at least in part on the second determination.

9. The mobile terminal of claim 8, wherein the controller is further configured to:
   transmit the third information to the stored e-mail address.

10. The mobile terminal of claim 1, wherein the controller is further configured to:
    present, via the display, a request for a first user input to be processed as the first information;
    in response to the first user input, control the memory to store the first information;
    present, via the display, a request for a second user input to be processed as the second information; and in response to the second user input, control the memory to store the second information.

11. The mobile terminal of claim 1, wherein the generated information includes a random password generated by the controller.

12. A method comprising:
storing, in a memory of a mobile terminal, first information and second information to be used to unlock the mobile terminal;
storing, in the memory, an e-mail address to be used in case of a failure to unlock the mobile terminal;
receiving, at the mobile terminal, a first input while the mobile terminal is locked;
presenting, via a display of the mobile terminal, a request for a second input based at least in part on a first determination that the first input does not correspond to the first information;
receiving, at the mobile terminal, the second input in relation to the request;
generating, at the mobile terminal, information based at least in part on a second determination that the second input corresponds to the second information; and
transmitting the generated information to the stored e-mail address.

13. The method of claim 12, further comprising:
checking whether a function to receive the second input is set based at least in part on the first determination.

14. The method of claim 12, further comprising:
presenting, via the display, a request for a first user input to be processed as the first information;
in response to the first user input, storing, in the memory, the first information;
presenting, via the display, a request for a second user input to be processed as the second information; and
in response to the second user input, storing, in the memory, the second information.

15. The method of claim 12, wherein the second information comprises at least one of a number or a character.

16. The method of claim 12, wherein at least one of a type, a length, or a complexity of the first information is different from a corresponding one of a type, a length, or a complexity of the second information.

17. The method of claim 12, wherein presenting the request comprises:
displaying an input window to receive the second input.

18. The method of claim 12, wherein presenting the request comprises:
displaying an indication corresponding to a length of the second input.

19. The method of claim 12, further comprising:
replacing, in the memory, the first information with third information to be used to unlock the mobile terminal, based at least in part on the second determination.

20. The method of claim 19, wherein transmitting the generated information to the stored e-mail address comprises:
transmitting the third information to the store e-mail address.

21. The method of claim 12, wherein generating the information comprises generating, at the mobile terminal, a random password.

22. A mobile terminal comprising:
a display;
a memory; and
a controller configured to:
store, via the memory, first information to be used to unlock the mobile terminal from a locked state to an unlocked state;
store, via the memory, second information to be used to unlock the mobile terminal from the locked state to the unlocked state;
store, via the memory, an e-mail address to be used in case of a failure to unlock the mobile terminal;
receive a first input while the mobile terminal is in the locked state;
display, via the display operatively coupled with the controller, a user interface for receiving a second input, based at least in part on a first determination that the first input does not correspond to the first information, wherein the user interface for receiving the second input is not displayed while receiving the first input;
receive the second input in relation to the user interface;
generate information based at least in part on a second determination that the second input corresponds to the second information; and
transmit the generated information to the stored e-mail address.

23. The mobile terminal of claim 22, wherein the unlocked state of mobile terminal unlocked using the first information is same as the unlocked state of the mobile terminal unlocked using the second information.

24. The mobile terminal of claim 22, wherein the controller is further configured to check whether a function is set to receive the second input based at least in part on the first determination.

25. The mobile terminal of claim 22, wherein at least one of a type, a length, or a complexity of the first information is different from a corresponding one of a type, a length, or a complexity of the second information.

26. The mobile terminal of claim 22, wherein the generated information includes a random password generated by the controller.

27. A mobile terminal comprising:
a display;
a memory; and
a controller configured to:
store, in the memory, first information and second information to be used to unlock the mobile terminal, the first information and the second information associated with a first user;
store, in the memory, an e-mail address to be used in case of a failure to unlock the mobile terminal;
receive a first input while the mobile terminal is in a locked state that prevents a second user from viewing or using one or more functions of the mobile terminal;
present, via the display operatively coupled with the controller, a request for a second input, based at least in part on a first determination that the first input does not correspond to the first information;
receive the second input in relation to the request;
generate information based at least in part on a second determination that the second input corresponds to the second information; and
transmit the generated information to the stored e-mail address.

28. The mobile terminal of claim 27, wherein an unlocked state of mobile terminal unlocked using the first information is same as the unlocked state of the mobile terminal unlocked using the second information.

29. The mobile terminal of claim 27, wherein the controller is further configured to check whether a function is set to receive the second input based at least in part on the first determination.

30. The mobile terminal of claim 27, wherein at least one of a type, a length, or a complexity of the first information is different from a corresponding one of a type, a length, or a complexity of the second information.

31. The mobile terminal of claim 27, wherein the generated information includes a random password generated by the controller.

* * * * *